United States Patent
Golan et al.

(10) Patent No.: US 10,760,492 B2
(45) Date of Patent: Sep. 1, 2020

(54) COOLING AIR ARCHITECTURE FOR COMPACT SIZE AND PERFORMANCE IMPROVEMENT

(71) Applicant: UNITED TECHNOLOGIES CORPORATION, Farmington, CT (US)

(72) Inventors: John W. Golan, Hebron, CT (US); Frederick M. Schwarz, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 872 days.

(21) Appl. No.: 15/097,782

(22) Filed: Apr. 13, 2016

(65) Prior Publication Data

US 2017/0298825 A1    Oct. 19, 2017

(51) Int. Cl.
*F02C 7/18* (2006.01)
*F02C 6/08* (2006.01)
*F04D 29/58* (2006.01)
*F01D 25/12* (2006.01)
*F02C 3/13* (2006.01)
(Continued)

(52) U.S. Cl.
CPC ............... *F02C 7/18* (2013.01); *F01D 25/12* (2013.01); *F02C 3/04* (2013.01); *F02C 3/13* (2013.01); *F02C 6/08* (2013.01); *F02C 7/143* (2013.01); *F02C 7/185* (2013.01); *F04D 29/5826* (2013.01); *F04D 29/5833* (2013.01); *F05D 2220/36* (2013.01); *F05D 2260/20* (2013.01); *F05D 2260/211* (2013.01); *F05D 2260/213* (2013.01); *F05D 2260/606* (2013.01); *F05D 2270/3062* (2013.01); *Y02T 50/676* (2013.01)

(58) Field of Classification Search
CPC .. F02C 7/143; F02C 7/185; F02C 6/08; F02C 3/13; F01D 25/12; F04D 29/5826; F04D 29/5833; F05D 2260/211; F05D 2260/213; F05D 2260/606; F05D 2270/3062
See application file for complete search history.

(56) References Cited

U.S. PATENT DOCUMENTS

| 4,503,683 A | 3/1985 | Wieland et al. |
| 6,385,987 B2 | 5/2002 | Schlom et al. |

(Continued)

FOREIGN PATENT DOCUMENTS

| EP | 0608142 A1 | 7/1994 |
| EP | 2604825 A2 | 6/2013 |
| EP | 2960468 A1 | 12/2015 |

OTHER PUBLICATIONS

European Search Report for European Application No. 17166056.6 dated Aug. 29, 2017.

*Primary Examiner* — Christopher Verdier
(74) *Attorney, Agent, or Firm* — Carlson, Gaskey & Olds, P.C.

(57) ABSTRACT

A gas turbine engine has a fan and a compressor section with a first lower pressure location and a second higher pressure location. A heat exchanger and a higher pressure tap from the second higher pressure location pass through the heat exchanger. Air in the higher pressure tap is cooled by air from a lower pressure tap from the first lower pressure location. A valve controls flow to the heat exchanger from the lower pressure tap, the valve being controlled to limit flow from the lower pressure tap under certain conditions.

17 Claims, 2 Drawing Sheets

(51) Int. Cl.
    *F02C 7/143*     (2006.01)
    *F02C 3/04*     (2006.01)

(56) References Cited

U.S. PATENT DOCUMENTS

| | | |
|---|---|---|
| 8,181,443 B2 | 5/2012 | Rago |
| 9,234,707 B2 | 1/2016 | Mackin et al. |
| 10,221,862 B2 * | 3/2019 | Suciu .................. F01D 25/12 |
| 2012/0180509 A1 * | 7/2012 | DeFrancesco ......... B64D 13/08 |
| | | 62/172 |
| 2013/0152602 A1 * | 6/2013 | Bacic ..................... F02C 6/08 |
| | | 60/782 |
| 2013/0164115 A1 * | 6/2013 | Sennoun ................ F02C 7/185 |
| | | 415/1 |
| 2014/0083106 A1 * | 3/2014 | Mackin .................. F28F 3/025 |
| | | 60/772 |

* cited by examiner

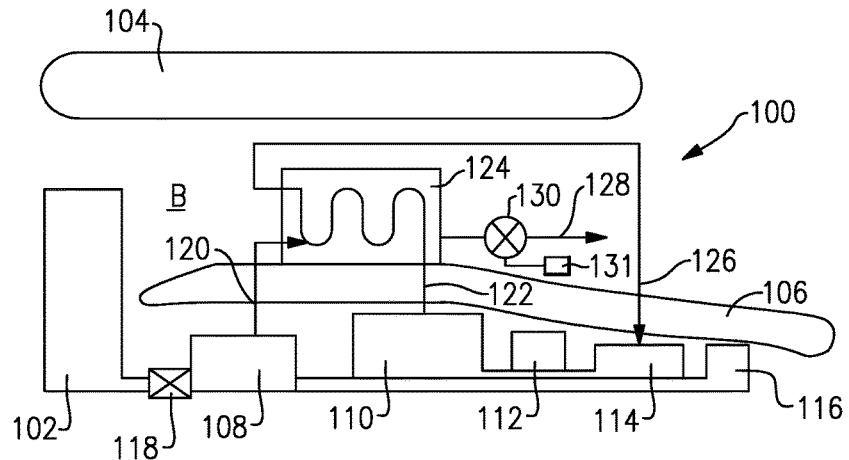
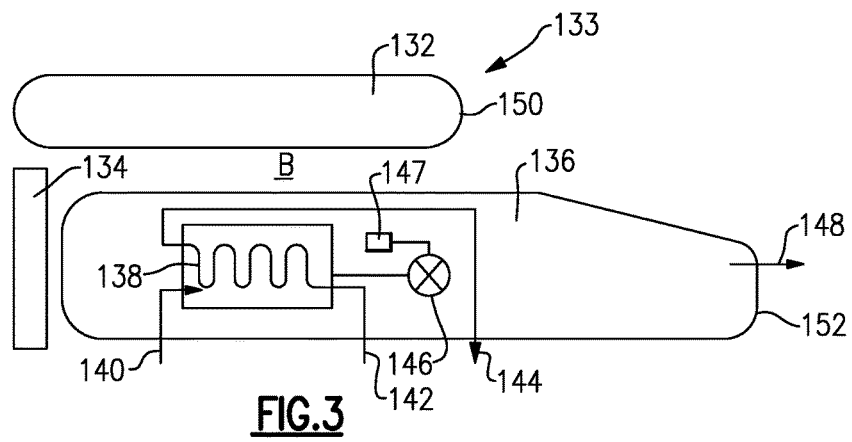
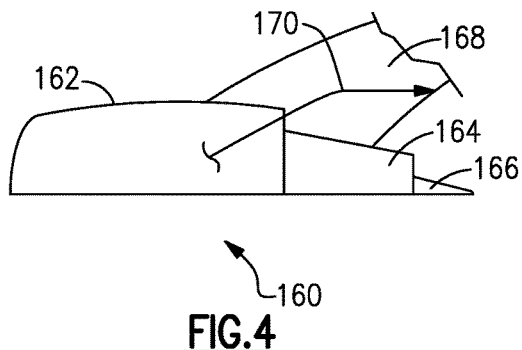
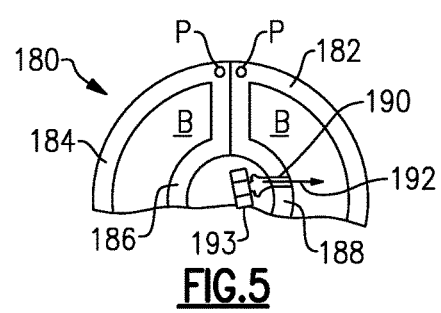

US 10,760,492 B2

COOLING AIR ARCHITECTURE FOR COMPACT SIZE AND PERFORMANCE IMPROVEMENT

BACKGROUND OF THE INVENTION

This application relates to a heat exchanger which cools air to be utilized for various uses on a gas turbine engine, and which is relatively compact.

Gas turbine engines are known and typically include a fan delivering air into a compressor section. The air is compressed and passed into a combustor where it is mixed with fuel and ignited. Products of this combustion pass downstream over turbine rotors driving them to rotate.

The fan also delivers air into a bypass duct which does not travel to the compressor, but instead provides propulsion as it exits the engine. A cold coldest source of air on a gas turbine engine is this fan bypass air.

Historically, the fan rotated at the same speed as a compressor rotor. However, more recently, a gear reduction has been placed between the two such that the fan rotates at slower speeds. With this, the diameter of the fan can increase, and a bypass ratio, or amount of air delivered into the bypass duct compared to the volume of air delivered into the compressor section also increases.

As can be appreciated, there are challenges with design and operation of a gas turbine engine. In particular, the turbine section is exposed to very hot temperatures. Thus, high pressure cooling air is typically delivered for various cooling uses, especially in the turbine section. The highest pressure source on the engine would be associated with a downstream location in a high pressure compressor section. However, this air is hot.

Thus, it is known to cool the high pressure air to be used for cooling. Typically, the air has been cooled by bypass air. However, and especially with the use of geared turbofans, the fan driven air in the bypass duct is at relatively low pressure and may not always adequately cool the air to be utilized as cooling air.

SUMMARY OF THE INVENTION

In a featured embodiment, a gas turbine engine has a fan and a compressor section with a first lower pressure location and a second higher pressure location. A heat exchanger and a higher pressure tap from the second higher pressure location pass through the heat exchanger. Air in the higher pressure tap is cooled by air from a lower pressure tap from the first lower pressure location. A valve controls flow to the heat exchanger from the lower pressure tap, the valve being controlled to limit flow from the lower pressure tap under certain conditions.

In another embodiment according to the previous embodiment, the valve is moved to limit the flow of air from the lower pressure tap when the engine is operating at lower power conditions.

In another embodiment according to any of the previous embodiments, the valve is moved to limit the flow of air from the lower pressure tap at idle.

In another embodiment according to any of the previous embodiments, the valve also limits the flow of air from the lower pressure tap at cruise conditions.

In another embodiment according to any of the previous embodiments, the valve is moved to limit flow from the lower pressure tap at ground idle conditions to allow the air from the higher pressure tap to preheat the heat exchanger prior to a takeoff condition.

In another embodiment according to any of the previous embodiments, the valve is controlled to allow the flow of air from the lower pressure tap during higher pressure conditions.

In another embodiment according to any of the previous embodiments, the higher pressure conditions include takeoff conditions.

In another embodiment according to any of the previous embodiments, the air from the higher pressure tap is delivered to uses in a turbine section downstream of the heat exchanger.

In another embodiment according to any of the previous embodiments, the valve is positioned downstream of the heat exchanger.

In another embodiment according to any of the previous embodiments, the fan delivers air into a bypass duct defined between an outer periphery of a core engine housing and an inner periphery of a nacelle and the heat exchanger is positioned in the bypass duct.

In another embodiment according to any of the previous embodiments, an exhaust of the air from the lower pressure tap is delivered into the bypass duct.

In another embodiment according to any of the previous embodiments, the fan delivers air into a bypass duct defined between an outer periphery of a core engine housing and an inner periphery of a nacelle and the heat exchanger is positioned in the bypass duct.

In another embodiment according to any of the previous embodiments, a nacelle is positioned outwardly of a core engine housing and the heat exchanger is positioned within the core engine housing.

In another embodiment according to any of the previous embodiments, an exhaust of the heat exchanger is at a downstream end of the core engine housing.

In another embodiment according to any of the previous embodiments, a downstream end of the nacelle is upstream of the downstream end of the core engine housing.

In another embodiment according to any of the previous embodiments, the exhaust is through a pylon which is provided to mount the engine to an aircraft.

In another embodiment according to any of the previous embodiments, a nacelle and a core housing have pivoting structures and a seal, and an exhaust of the lower pressure tap is through the seal into the bypass duct.

In another embodiment according to any of the previous embodiments, the second higher pressure location is at a downstream end of a high pressure compressor section.

In another embodiment according to any of the previous embodiments, the first lower pressure location is within a low pressure compressor section.

In another embodiment according to any of the previous embodiments, the first lower pressure location is within a low pressure compressor section.

These and other features may be best understood from the following drawings and specification.

BRIEF DESCRIPTION OF THE DRAWINGS

FIG. 2 shows features of an embodiment.
FIG. 3 shows an alternative embodiment.
FIG. 4 shows another alternative embodiment.
FIG. 5 shows yet another alternative embodiment.

DETAILED DESCRIPTION

Figure 1:
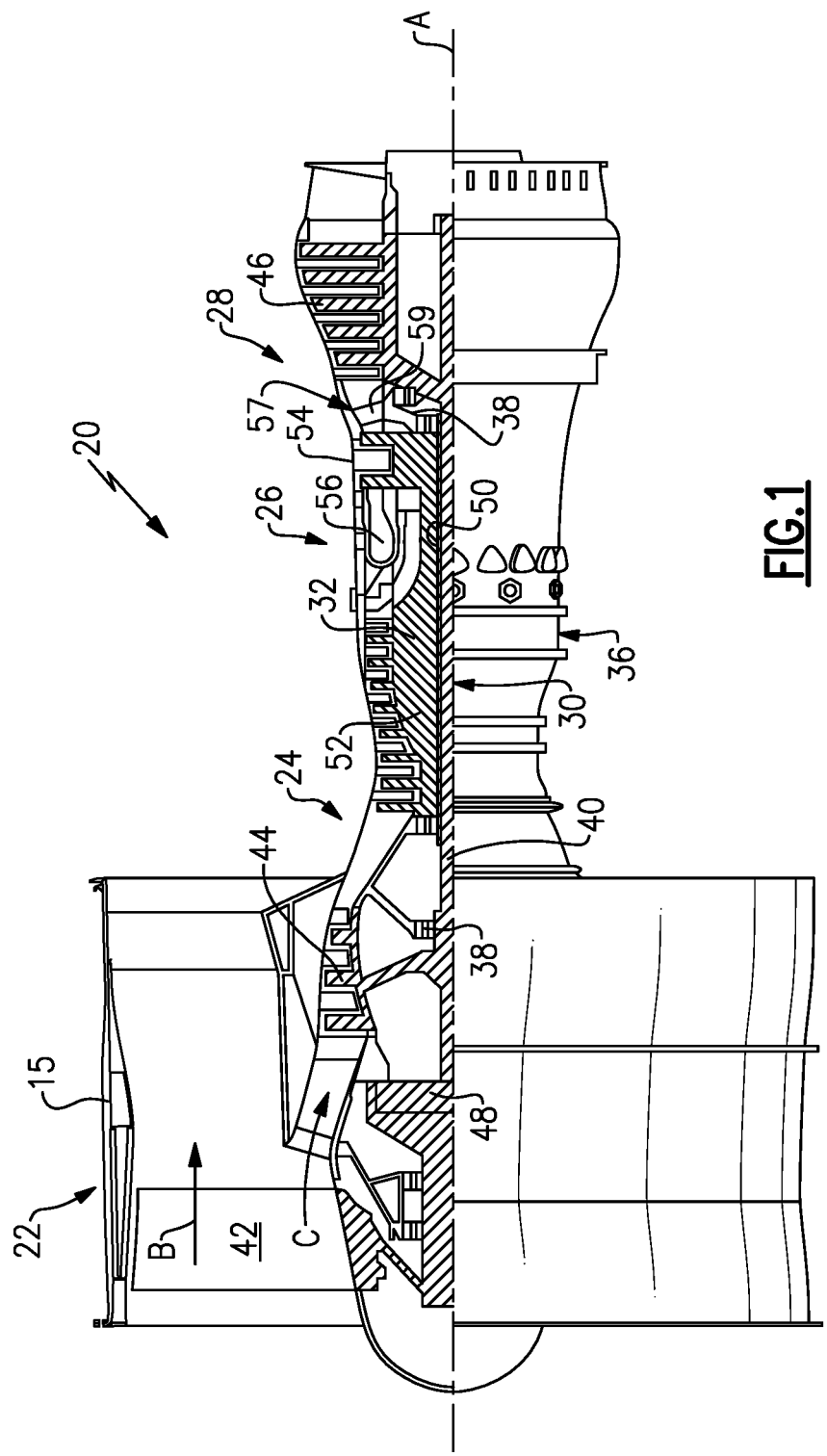
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

FIG. 2 shows an engine 100 including a fan rotor 102 positioned within a nacelle 104. A core housing 106 encloses a low pressure compressor section 108 and a high pressure compressor section 110. A combustor 112 is downstream of the high pressure compressor 110. A high pressure turbine 114 drives the high pressure compressor 110 and a fan drive turbine 116 drives the low pressure compressor 108. An intermediate gear reduction 118 allows the fan rotor 102 to rotate with the low pressure compressor section 108, but at lower speeds.

As shown, the fan rotor 102 delivers bypass air into a bypass duct B. A lower pressure cooling air tap 120 is tapped from a location in the low pressure compressor section 108. Alternatively, the tap 120 could come from upstream portions of the high pressure compressor section 110. A higher pressure tap 122 is taken from downstream locations in the high pressure compressor 110, and passes through a heat exchanger 124. The air taken from the tap 120 is also passed over the heat exchanger 124, with the two flows from each tap 120 and 122 maintained separate in heat exchanger 124. The air from tap 120 cools the relatively hot air from the tap 122. Downstream of the heat exchanger 124, the air from tap 122 passes to a line 126 and is utilized for various uses on a gas turbine engine such as cooling components in the high pressure turbine section 114.

The air from tap 120 is exhausted at 128 and a valve 130 is placed upstream of the exhaust 128. The heat exchanger 124 is mounted in the bypass duct B in this embodiment, and the exhaust 128 also passes into the bypass duct. Thus, the exhaust 128 will contribute to the propulsion provided by the air from the fan rotor 102 passing through the bypass duct B. Under certain conditions, it may not be necessary to have the air from tap 120 cooling the air from tap 122. As an example, at cruise conditions, perhaps bypass air alone could cool the air from tap 122.

Thus, the valve 130 is controlled by control 131 to block the flow of air from the tap 120 under low power conditions. This increases the efficiency of the engine as the air compressed to tap 120 may be combusted rather than used for cooling.

As an example, at takeoff, the valve 130 may be open such that air passes from tap 120 through the heat exchanger 124 and cools the air from the tap 122. However, the control 131 for the valve may modulate or even close the valve 130 under lower power conditions such as cruise or idle.

In addition, the flow of hot air from the tap 122 may be utilized to preheat the heat exchanger 124 at ground idle. The valve 130 will be modulated towards a closed position, if not closed altogether. In this manner, the air from tap 122 will preheat the heat exchanger 124. Now, when the engine moves to takeoff conditions, the air 122 will become much hotter. Without the preheating of the heat exchanger 124, there would be thermal stresses on the heat exchanger components. However, since the air 122 did pass through the heat exchanger 124 at the lower power idle condition, but without the flow of cooling air from tap 120, the thermal stresses on the heat exchanger 124 will be reduced.

FIG. 3 shows an engine embodiment 133. Again, nacelle 132 is positioned outside of a fan rotor 134. A core engine housing 136 houses the heat exchanger 138. Again, there is a tap 140 for cooling air from a lower pressure location in the compressor and the tap 142 from a higher pressure location. Air from tap 142, downstream of the heat exchanger 138, passes to point 144 where it moves towards the turbine section for various cooling purposes. A valve 146 is also provided with a control 147 which may operate in a manner similar to that disclosed above with regard to FIG. 2.

In this embodiment, the exhaust 148 passes outwardly of a nozzle at the end 152 of the core housing 136. In this manner, the exhaust air 148 need not overcome the pressure in the bypass duct B. Notably, the end 152 is downstream of the end 150 of the nacelle 132, such that the pressure seen by exhaust 148 will be relatively low compared to that seen by the exhaust 128 in the FIG. 2 embodiment.

FIG. 4 shows an engine embodiment 160 having a nacelle 162, a core housing 164, and an exhaust cone 166 that can be combined with any prior embodiment. A pylon 168 mounts the engine 160 to an aircraft. The exhaust 170 is positioned in the pylon 168. Here again, the exhaust will thus "see" lower pressure than if the exhaust were in the bypass duct.

FIG. 5 shows an engine embodiment 180 that can be combined with any prior embodiment. As known, the nacelle and the core housings are typically formed of two pivoting sections 182 and 184 that pivot about point P to process access to internal components. The core housing has sections 186 and 188 that pivot with the sections 184 and 182, respectively. A so-called "kiss seal" 190 is positioned within the housing portion 188 and receives the exhaust 192 in this embodiment. In this embodiment, the heat exchanger 193 would be mounted within the core housing, similar to the FIG. 3 embodiment. However, the air would exhaust into the bypass stream and the bypass duct B, and provide propulsion air.

The controls 131 and 147 may be stand-alone controls, or may be incorporated into a control for the overall engine such as a FADEC.

While the valves 130 and 146 are shown schematically, any known way of limiting airflow may be utilized, such as a door or other controllable valve.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a fan, a turbine section, and a compressor section said compressor section having a first lower pressure location and a second higher pressure location; and
   a heat exchanger and a higher pressure tap from said second higher pressure location passing through said heat exchanger, and air in said higher pressure tap being cooled by air from a lower pressure tap from said first lower pressure location, and a valve controlling flow to said heat exchanger from said lower pressure tap, said valve being controlled to limit flow from said lower pressure tap, said valve is moved to limit the flow of air from said lower pressure tap when the engine is operating at an idle condition;
   wherein air from said higher pressure tap being maintained separate from air from said lower pressure tap across said heat exchanger; and
   wherein said air from said higher pressure tap being delivered to said turbine section downstream of said heat exchanger.

2. The gas turbine engine as set forth in claim 1, wherein said valve also limits the flow of air from said lower pressure tap at cruise conditions.

3. The gas turbine engine as set forth in claim 1, wherein said valve is moved to limit flow from said lower pressure tap at said idle condition to allow said air from said higher pressure tap to preheat said heat exchanger prior to a takeoff condition.

4. The gas turbine engine as set forth in claim 1, wherein said valve is controlled to allow the flow of air from said lower pressure tap during higher pressure conditions at which the engine is operating at a higher pressure condition than said idle condition.

5. The gas turbine engine as set forth in claim 4, wherein said higher pressure conditions include takeoff conditions.

6. The gas turbine engine as set forth in claim 1, wherein said valve is positioned downstream of said heat exchanger.

7. The gas turbine engine as set forth in claim 6, wherein said fan delivers air into a bypass duct defined between an outer periphery of a core engine housing and an inner periphery of a nacelle and said heat exchanger is positioned in said bypass duct.

8. The gas turbine engine as set forth in claim 7, wherein an exhaust of said air from said lower pressure tap is delivered into said bypass duct.

9. The gas turbine engine as set forth in claim 1, wherein said fan delivers air into a bypass duct defined between an outer periphery of a core engine housing and an inner periphery of a nacelle and said heat exchanger is positioned in said bypass duct.

10. The gas turbine engine as set forth in claim 1, wherein a nacelle is positioned outwardly of a core engine housing and said heat exchanger is positioned within said core engine housing.

11. The gas turbine engine as set forth in claim 10, wherein an exhaust of said heat exchanger is at a downstream end of said core engine housing.

12. The gas turbine engine as set forth in claim 11, wherein a downstream end of the nacelle is upstream of the downstream end of said core engine housing.

13. The gas turbine engine as set forth in claim 10, wherein said exhaust is through a pylon which is provided to mount said engine to an aircraft.

14. The gas turbine engine as set forth in claim 1, wherein a nacelle and a core housing have pivoting structures and a seal, and an exhaust of said lower pressure tap is through said seal into said bypass duct.

15. The gas turbine engine as set forth in claim 1, wherein said second higher pressure location is at a downstream end of a high pressure compressor section.

16. The gas turbine engine as set forth in claim 15, wherein said first lower pressure location is within a low pressure compressor section.

17. The gas turbine engine as set forth in claim 1, wherein said first lower pressure location is within a low pressure compressor section.

\* \* \* \* \*